United States Patent Office 2,973,334
Patented Feb. 28, 1961

2,973,334

COMPOSITION COMPRISING AN ORGANOPOLY-
SILOXANE RESIN AND A CARBODIIMIDE

James Jack, Elderslie, Scotland, assignor to Imperial Chemical Industries Limited, London, England, a corporation of Great Britain No Drawing. Filed Oct. 11, 1957, Ser. No. 689,485

Claims priority, application Great Britain Oct. 17, 1956

10 Claims. (Cl. 260—33.6)

This invention relates to new and improved resinous compositions and more particularly to such resinuous compositions comprising one or more organopolysiloxanes.

Organopolysiloxanes are well known and widely available compounds comprising an alternating chain of oxygen and silicon atoms in which the major proportion of the remaining silicon valencies are taken up by organo groups. These materials are normally prepared by the hydrolysis and subsequent condensation of silanes containing reactive groups, for example, the halo-, alkoxy or aroxy-silanes. Depending on the relative proportion of mono-, di- and tri- functional silanes present and the methods of hydrolysis and condensation the product obtained may be a fluid or a resin. Methods of preparing organopolysiloxane resins are described in British patent specifications Nos. 542,655, 527,230, 585,626, 585,627, 624,019 and 633,849.

Organopolysiloxane resins are normally capable of undergoing further condensation to the infusible and insoluble stage on further heat treatment either alone or in presence of a catalyst. Catalysts which have been proposed for this use include e.g. metal resinates and naphthenates, certain organo-tin compounds and certain quaternary bases.

These catalysts, however, suffer from various disadvantages, for example, in some cases the resinous compositions have only a limited shelf life after addition of the catalyst while in other cases considerable discolouration takes place.

An object of the present invention is to provide rapid curing organopolysiloxane resinous compositions. Another object is to provide such compositions which have an improved shelf life. A further object is to provide such compositions which will not discolour on storage or on curing.

According to the present invention these objects are accomplished by a composition comprising one or more resinous organopolysiloxanes capable of being cured by heat to an infusible, insoluble mass and, as a curing agent therefor, a carbodiimide.

The resinous organopolysiloxanes suitable for use in the compositions of our invention include those in which the organo groups are alkyl, such as methyl or ethyl, aryl such as phenyl, alkylene such as vinyl or cyclo-aliphatic such as cyclohexyl and which may also contain hydrogen bonded to silicon. They may contain one, two or more organo groups, which may be the same or different, per polymer unit. The ratio of organo groups to silicon atoms is preferably of the order of from 1 to 1 to 1.8 to 1 and organopolysiloxanes having an organo group to silicon ratio from 1.2 to 1 to 1.6 to 1 are particularly to be preferred.

The carbodiimides which may be used in the compositions of our invention include those in which the terminal groups may be the same or different and may be alkyl, aryl, aralkyl, alkaryl, cycloaliphatic or saturated heterocyclic groups. Suitable carbodiimides include dicyclohexyl-, di-p-tolyl-, di-isopropyl-, phenyl-cyclohexyl-, di-4-tetrahydropyranyl- and cyclohexyl-4-tetrahydropyranyl-carbodiimides. It is preferred that the terminal groups of the carbodiimide should not contain more than about 10 carbon atoms each. Di-cyclohexyl-carbodiimide is further preferred, on account of its valuable properties and availability.

The carbodiimide may be used in amounts up to about 10 percent by weight of the organopolysiloxane content of the resinous composition but normally amounts of the order of 5 percent or less are adequate. The optimum concentration will, of course, depend on the desired temperature of curing and on the hydroxyl content of the organopolysiloxane. Thus, while for organopolysiloxanes having about 3 percent hydroxyl groups amounts of about 3 percent are adequate to produce minimum cure times at 200° C. organopolysiloxanes having about 4 percent hydroxyl groups require only amounts of the order of about 1 percent.

The resinous compositions of our invention normally also comprise an organic solvent in amount from about 30 to 65 percent by weight of the composition. Suitable solvents include aromatic hydrocarbons such as, e.g. toluene or xylene, oxygenated solvents such as butyl acetate or butanol, chlorinated hydrocarbons such as trichlorethylene and the like.

Our invention is further illustrated by the following examples in which all parts and percentages are by weight.

*Examples 1–5*

A number of resinous compositions were prepared by incorporating various carbodiimides in a toluene solution containing 65 percent organopolysiloxanes. The organopolysiloxanes used contained 4.15 percent of hydroxyl groups by weight and contained phenyl and methyl groups in the ratio 0.5 to 1, the ratio of phenyl plus methyl groups to silicon atoms being 1.5 to 1. These compositions and a similar composition containing no carbodiimide were heated in thin layers at 200° C. and the cure times determined. The results obtained are given in the table below.

| Example | Curing agent | Concentration percent (of compositions) | Cure time (secs.) |
| --- | --- | --- | --- |
| 1 | Di-cyclohexylcarbodiimide | 1 | 60 |
| 2 | Di-p-tolylcarbodiimide | 1 | 170 |
| 3 | Di-isopropylcarbodiimide | 1 | 150 |
| 4 | Phenyl-cyclohexylcarbodiimide | 1 | 90 |
|   | None | | 360 |

The composition of Example 1 was subjected to storage tests to determine its shelf life when it was found that no gelation took place over a period of 8 months.

*Examples 5–10*

A number of resinous compositions were prepared by incorporating various carbodiimides in a toluene solution containing 62% organopolysiloxanes. The organopolysiloxanes used contained 4.15 percent of hydroxyl groups and contained phenyl and methyl groups in the ratio of 0.77 to 1, the ratio of phenyl plus methyl groups to silicon atoms being 1.4 to 1. The resinous compositions obtained were heated in thin layers at 200° C. and the cure times determined. The results obtained are given below:

| Example | Curing agent | Concentration percent (of compositions) | Cure time (secs.) |
|---|---|---|---|
| 5 | Di-4-tetrahydropyranylcarbodiimide | 1 | 70 |
| 6 | Cyclohexyl-4-tetrahydropyranylcarbodiimide | 1 | 60 |
| 7 | Di-tert-octylcarbodiimide | 1 | 110 |
| 8 | Phenyl-4-tetrahydropyranylcarbodiimide | 1 | 110 |
| 9 | Cyclohexyl-tert-butyl-carbodiimide | 1 | 60 |
| 10 | Cyclohexyl-tert-octylcarbodiimide | 1 | 70 |
| | None | | 590 |

*Examples 11–12*

Two compositions were prepared by dissolving 1 percent and 3 percent of di-cyclohexylcarbodiimide in a toluene solution containing 60 percent organopolysiloxanes. The organopolysiloxanes used contained 2.8 percent by weight of hydroxyl groups and contained phenyl and methyl groups in the ratio 1.33 to 1, the ratio of phenyl plus methyl groups to silicon atoms being 1.4 to 1. These compositions and a similar one containing no catalyst were heated in thin layers at 200° C. and the cure times determined. The results obtained are shown below.

| Example | Catalyst content, percent | Cure time (min.) |
|---|---|---|
| 11 | 1 | 7.25 |
| 12 | 3 | 4.58 |
| | 0 | 35 |

What I claim is:

1. A composition comprising resinous organopolysiloxanes capable of being cured by heat to an infusible, insoluble mass and as a curing agent therefor up to about 10% by weight of a monocarbodiimide selected from the group consisting of alkyl, aryl, alkaryl, cycloaliphatic and saturated heterocyclic monocarbodiimides wherein the ratio of organo groups to silicon atoms in the organopolysiloxane is from 1:1 to 1.8:1.

2. A composition as claimed in claim 1 wherein the monocarbodiimide is di-p-tolyl carbodiimide.

3. A composition as claimed in claim 1 wherein the monocarbodiimide is diisopropyl carbodiimide.

4. A composition as claimed in claim 1 wherein the terminal groups of the said monocarbodiimide contain not more than 10 carbon atoms.

5. A composition as claimed in claim 1 wherein the monocarbodiimide is dicyclohexyl carbodiimide.

6. A composition as claimed in claim 1 wherein the resinous organopolysiloxane is selected from the group consisting of methyl and ethyl polysiloxanes.

7. A composition as claimed in claim 1 wherein the organopolysiloxane is a phenyl polysiloxane.

8. A composition as claimed in claim 1 wherein the organopolysiloxane has about 3% by weight hydroxyl groups and the carbodiimide is used in amounts of about 3% by weight of the organopolysiloxane.

9. A composition as claimed in claim 1 wherein an organic solvent is included in amount from about 30 to about 65% by weight thereof.

10. A composition as claimed in claim 1 wherein the hydrocarbon solvent is selected from the group consisting of toluene and xylene.

References Cited in the file of this patent

UNITED STATES PATENTS

| | | |
|---|---|---|
| 2,430,479 | Pratt et al. | Nov. 11, 1947 |
| 2,676,948 | Rowley | Apr. 27, 1954 |
| 2,728,743 | Warrick | Dec. 27, 1955 |